(12) United States Patent
Spanovich et al.

(10) Patent No.: US 11,060,304 B1
(45) Date of Patent: Jul. 13, 2021

(54) DECK BOARD APPARATUS AND METHOD OF MAKING SAME

(71) Applicant: Strongwell Corporation, Bristol, VA (US)

(72) Inventors: Joe Spanovich, Bristol, TN (US); Barry Myers, II, Marion, VA (US)

(73) Assignee: Strongwell Corporation, Bristol, VA (US)

( * ) Notice: Subject to any disclaimer, the term of this patent is extended or adjusted under 35 U.S.C. 154(b) by 0 days.

(21) Appl. No.: 16/833,486

(22) Filed: Mar. 27, 2020

(51) Int. Cl.
| | | |
|---|---|---|
| *E04F 15/02* | (2006.01) | |
| *E04B 1/00* | (2006.01) | |
| *E04F 15/10* | (2006.01) | |
| *B29C 70/52* | (2006.01) | |
| *B29L 31/10* | (2006.01) | |

(52) U.S. Cl.
CPC ...... *E04F 15/02044* (2013.01); *B29C 70/521* (2013.01); *E04B 1/003* (2013.01); *E04F 15/02183* (2013.01); *E04F 15/102* (2013.01); *E04F 15/105* (2013.01); *B29L 2031/10* (2013.01); *E04F 2015/02111* (2013.01); *E04F 2203/00* (2013.01)

(58) Field of Classification Search
CPC ............ E04F 15/02183; E04F 15/10; E04F 2201/0161; E04F 15/02044; E04F 15/102; E04F 15/105; E04F 2015/02111; E04F 2203/00; B29L 2031/10; B29C 70/521
See application file for complete search history.

(56) References Cited

U.S. PATENT DOCUMENTS

| | | | | |
|---|---|---|---|---|
| 2,681,716 A | * | 6/1954 | Black | B60R 13/04 52/718.05 |
| 3,722,473 A | * | 3/1973 | Vickstrom | A01K 1/0151 119/529 |
| 5,048,448 A | * | 9/1991 | Yoder | E02B 3/068 114/263 |
| 5,351,458 A | * | 10/1994 | Lehe | A01K 1/015 119/529 |
| 5,613,339 A | * | 3/1997 | Pollock | B63B 3/48 52/836 |
| 5,735,094 A | * | 4/1998 | Zember | B28B 11/0818 427/282 |
| 5,735,097 A | * | 4/1998 | Cheyne | B63B 5/06 114/263 |
| 5,758,456 A | * | 6/1998 | Case | E04C 2/20 52/177 |
| 5,826,382 A | * | 10/1998 | Elsasser | E01C 5/20 52/181 |
| 5,881,508 A | * | 3/1999 | Irvine | E01C 5/20 405/219 |

(Continued)

FOREIGN PATENT DOCUMENTS

| | | | | |
|---|---|---|---|---|
| CA | 2488528 A1 | 5/2006 | | |
| WO | WO-2019012477 A1 | * | 1/2019 | B29C 48/00 |

*Primary Examiner* — Theodore V Adamos
(74) *Attorney, Agent, or Firm* — Woods Rogers PLC; Nathan A. Evans

(57) ABSTRACT

A pultruded deck board attachment fastened to a substructure to provide a stiffer and stronger deck board than a wood, wood composite, or plastic deck board, wherein the pultruded deck board attachment, along with any fasteners, is covered and protected with an extruded walking surface that is, in examples, snapped in to place.

11 Claims, 13 Drawing Sheets

(56) References Cited

U.S. PATENT DOCUMENTS

| | | | | |
|---|---|---|---|---|
| 5,950,377 | A * | 9/1999 | Yoder | E04F 15/10 52/177 |
| 6,131,355 | A | 10/2000 | Groh et al. | |
| 6,170,212 | B1 * | 1/2001 | Suchyna | E01C 5/20 52/177 |
| 6,233,886 | B1 * | 5/2001 | Andres | E01C 5/005 114/267 |
| 6,301,842 | B1 * | 10/2001 | Chaney | E04B 5/12 52/177 |
| 6,374,555 | B1 * | 4/2002 | Gusler | E01C 5/223 108/90 |
| 6,584,748 | B2 * | 7/2003 | Bresnahan | E04C 2/427 52/650.3 |
| 6,955,021 | B2 | 10/2005 | Thomas | |
| 8,006,444 | B2 | 8/2011 | Perkowski et al. | |
| 8,276,344 | B2 * | 10/2012 | Hawkins, III | E04B 5/10 52/783.14 |
| 8,726,612 | B2 * | 5/2014 | Lomske | E04F 15/02044 52/177 |
| 9,416,546 | B2 * | 8/2016 | Claudin | E04F 15/02022 |
| 9,528,277 | B2 * | 12/2016 | Prati | E04F 15/02044 |
| 9,803,376 | B1 * | 10/2017 | Deel | E04B 1/003 |
| 2003/0101673 | A1 * | 6/2003 | West | E04B 5/026 52/489.1 |
| 2003/0140581 | A1 * | 7/2003 | Ludington | E04F 15/10 52/177 |
| 2003/0154662 | A1 * | 8/2003 | Bruchu | E04F 15/10 52/87 |
| 2006/0242916 | A1 * | 11/2006 | Simko | E04F 19/061 52/177 |
| 2012/0110941 | A1 * | 5/2012 | Biro | E04F 19/061 52/578 |
| 2014/0363621 | A1 | 12/2014 | Ngo | |
| 2015/0308115 | A1 * | 10/2015 | Guhde | E04F 13/0866 428/67 |

* cited by examiner

DECK BOARD APPARATUS AND METHOD OF MAKING SAME

BACKGROUND OF THE INVENTION

Field of the Invention

The present invention is directed to a deck board assembly apparatus, wherein the deck board is manufactured, in aspects, using a pultrusion process, wherein the deck board is, in aspects, comprised of fibrous reinforcements and a resin matrix, wherein the deck board, in aspects, may be coupled to a structural joist member and coupled to a snap-on decking surface, wherein the decking surface is, in aspects, manufactured using an extrusion process, and wherein, in aspects, the decking surface is comprised of thermoplastic resin.

Description of the Related Art

Polymeric decking exists but can be expensive and difficult to install. For example, U.S. Appln. No. 2014/0363621 teaches, for example, a plastic deck board, but it does not address a new structural deck board like the current invention. The structural deck board in U.S. Appln. No. 2014/0363621 is a modification of an existing wood or plastic deck board, whereas the pultruded deck board attachment of the current invention is not retrofitted or modified, but pultruded for a specific top cap. The top cap reference in U.S. Appln. No. 2014/0363621 is either bonded, screwed, or snapped on to the modified deck board, but the snapped version top cap must be notched to clear the joists. According to the current invention, the extruded decking surface capping apparatus does not need to be notched as it is snapped on to existing top side nubs, for example, of a pultruded deck board attachment.

According to Canadian patent no. 2,488,528, a decking board is taught that is injection molded. The pultruded deck board attachment according to the current invention is a pultruded member using, in aspects, continuous filament and multi-axis fiberglass using the pultrusion process. This approach provides a stiffer and stronger structural member compared to injection molding. The pultruded deck board attachment according to the current invention can be pultruded to any length, whereas the Canadian patent no. 2,488,528 injection molded device is limited to relatively short lengths. This reference, by way of example, shows an inherent gap between a top cap and a structural deck board used to engage the top cap lip to the undercut side shoulder. Stepping on this edge can potentially disengage the attachment, which is non-optimal in many use applications. The current device herein, on the other hand, relies, in aspects, on an extruded decking surface capping apparatus to deform around and over, for example, rounded nubs of a pultruded deck board attachment resulting in little to no gaps at the attachment. In embodiments herein, this pultruded deck board attachment employs a lower horizontal flange in which a hole is drilled to fasten the pultruded deck board attachment to a joist. In other art, such as Canadian patent no. 2,488,528, employs slots, which allow the injection molded deck board to overcome friction and slide longitudinally. Overtightening the fasteners could potentially widen the slots, pushing the sides to deform and not allowing for proper top cap engagement, whereas a pultruded deck board attachment allows for the use of common flat head deck screws and overtightening would not cause nub distortion that would impede the proper engagement of the extruded decking surface capping apparatus, for example.

U.S. Pat. No. 6,131,355 teaches an extruded product without continuous filament fiberglass, while the current invention herein describes and claims a pultruded deck board attachment, which in aspects is a pultruded member using continuous filament and multi-axis fiberglass using the pultrusion process. This provides a stiffer and stronger structural member than related art. Additionally, the configuration of U.S. Pat. No. 6,131,355 teaches a conceptual design that allows for water to drain only if vertical grooves are cut into the deck board. However, in the currently claimed invention herein, the pultruded deck board attachment is spaced, in preferred embodiments, such that water or other liquids will freely flow from the horizontal surface of the (in aspects, extruded) decking surface capping apparatus to longitudinal gaps. Moreover, the embodiment taught by the related art, including U.S. Pat. No. 6,131,355, employs fasteners that are not hidden upon final assembly.

U.S. Pat. No. 8,006,444 does not employ a top cap to hide fasteners installed from the top, and the product is preferably extruded aluminum. U.S. Pat. No. 6,955,021 does not address a new structural deck board. While the structural deck board in U.S. Pat. No. 6,955,021 is an existing deck board such as a 2×4 or 2×6, the top cap reference in this reference, if snapped on, must be notched to clear the joists. On the other hand, the current extruded decking surface capping apparatus as described herein does not need to be notched as it is, in embodiments, snapped on to existing top side nubs of a pultruded deck board attachment.

Further regarding related art, a top cap if snapped on can require a separate channel installed on to the joist between deck boards. The pultruded deck board attachment according to the present invention employs integrated top side nubs instead of a separate device.

Regarding typical wood deck boards attached to a frame, the natural thickness shrinkage of the existing aging, weathered wood deck boards can cause fit-up issues such as gapping in between the cap and the deck board. Conversely, natural thickness expansion of the existing aging, weathered wood deck boards can prevent a top cap from engaging a snapping mechanism. The stability of a pultruded deck board attachment, as described herein, will alleviate these issues experienced in related art teachings. Moreover, the current extruded decking surface capping apparatus as described herein does not need to be vented as the pultruded deck board attachment is a pultruded member, which in aspects, will not rot or swell due to water entrapment. Furthermore, adding a top cap to existing deck boards as described herein will decrease the longitudinal gapping, which causes water drainage and trapped debris issues. The pultruded deck board attachment as described herein is spaced such that water will freely flow from the horizontal surface of the extruded decking surface capping apparatus to longitudinal gaps. Consequently, the invention taught herein is a vast improvement over past related art.

SUMMARY OF THE INVENTION

In one embodiment of the present invention, a device is provided that allows for a pultruded attachment apparatus to be attached to a decking frame or beam and then coupled to an extruded decking surface capping apparatus. In another embodiment of the present invention, the attachment apparatus is preferably a pultruded deck board attachment, which allows for support and attachment to a decking frame or beam comprising three or more support extensions, two or more of which can be used to attach the device to the decking frame or beam, as well as a second apparatus that acts as a decking surface that is snapped on or otherwise affixed to the support and attachment device, such as an extruded decking surface capping apparatus. In embodiments, the pultruded attachment apparatus makes available channels for screw heads, by way of example, to be recessed so as not to interfere with the extruded decking surface capping apparatus. In aspects, the pultruded attachment apparatus makes available channels for the screw heads to be recessed where the bottom of the channel is shaped to fit a countersunk head deck fastener or other fastener head shapes. In aspects, the pultruded attachment apparatus makes available channels for decorative end caps to be attached. And in other aspects, the pultruded attachment apparatus employs a series of vertical ribs and horizontal flanges to maximize stiffness and minimize weight.

For example, the pultruded deck board attachment may employ a series of horizontal flats that rest on the decking frame or beam. The centermost vertical rib and horizontal foot add support to the middle portion across the width of the pultruded deck board attachment, in aspects. The extruded decking surface capping apparatus may employ a thicker wall where it spans the channels of the pultruded deck board attachment. This allows for stronger support structure when a concentrated load, such as high heel or a chair foot, is applied.

In aspects, the pultruded attachment apparatus makes available channels for the decking surface capping apparatus to be removed by cutting with a circular saw (or other cutting device) such that the circular saw blade protrudes through the decking surface capping apparatus while not cutting into the pultruded attachment apparatus. An optional variable fence on the circular saw can be set such that the outermost edge of the decking surface capping apparatus can be used as a guide.

In embodiments, the pultruded deck board attachment (also referred to as pultruded attachment apparatus or connection apparatus) can be attached to the decking frame or beam and provide adequate support for personnel or equipment without attaching the decking surface capping apparatus. Protection of the pultruded deck board attachment while ancillary construction is performed, typically with plywood, is unnecessary, as scuffs and scratches of the pultruded deck board attachment can later be covered with the decking surface capping apparatus.

In aspects, an extruded drain channel can be placed in between the pultruded deck board attachment to prevent water from penetrating the deck assembly. The extruded drain channel may also be used as a spacer for adjacent pultruded deck board attachments. The pultruded deck board attachment may employ rounded nubs on both sides to allow an extruded decking surface capping apparatus to be snapped on. In aspects, the extruded decking surface capping apparatus may employ rounded nubs on both sides and act as a drip edge for shedding water. The pultruded deck board attachment can have aesthetic flaws and use left-over pultrusion resin of multiple colors since the extruded decking surface capping apparatus will cover the pultruded deck board attachment upon final assembly. This will significantly reduce cost due to the reduction of scrap.

In another embodiment of the present invention, a method of making the attachment apparatus by pultrusion and a method of making the decking surface capping apparatus by extrusion is taught, wherein the attachment apparatus is pultruded using a composite of fibrous reinforcements and a resin matrix and wherein the decking surface capping apparatus is extruded using a compound of thermoplastic resins, for example.

In a preferred embodiment of the present invention (see, e.g., FIG. 18), a method of pultruding a decking attachment apparatus is taught, wherein the steps of making the decking attachment apparatus comprise:

continuously pulling (dry) fibrous reinforcements, such as fiberglass rovings and continuous filament mat, off creels or doffs;

pulling through guide plates to align with the resin wet-out baths;

pulling through a wet-out bath containing an uncured catalyzed liquid resin matrix;

pulling through a preformer to consolidate, shape, and form the saturated fibrous reinforcement;

pulling through a heated, constant cross-sectional die to cure and harden the decking attachment apparatus;

pulling through a continuous pulling system apparatus;

pulling through a cut-off saw to cut the decking attachment apparatus to a specified length.

Acceptable variations to the above would be well understood by one of ordinary skill in the art.

In aspects, the deck board attachment is pultruded with a resin matrix and a fibrous reinforcement. The pultruded attachment apparatus, processed with a resin matrix and fiberglass, will resist rot from trapped moisture or water infiltration. The pultruded deck board attachment, in aspects, resists expansion and contraction due to temperature variations. The pultruded deck board attachment using a composite of fibrous reinforcements and a resin matrix, resists losing appreciable stiffness or strength at elevated temperatures (e.g., in the 160° F. range). The pultruded deck board attachment, reinforced with continuous unidirectional fiberglass, will be stiffer than wood or an extruded thermoplastic, in aspects.

Further, the pultruded deck board attachment, reinforced with continuous unidirectional fiberglass, will resist creep and may be lighter than another material, such as wood or an extruded part. In aspects, the pultruded deck board attachment is a constant cross section. And, in aspects, the pultruded deck board attachment has a crowned top to allow for, for example, shedding water off the conforming extruded decking surface capping apparatus, and also allowing the conforming extruded decking surface capping apparatus to be pre-stressed after it is snapped on, which may allow for a tighter fit.

In a preferred embodiment of the present invention (see, e.g., FIG. 19), a method of extruding a decking surface capping apparatus meant to be coupled to a pultruded attachment or connection apparatus is taught, wherein the steps of making the decking surface capping apparatus comprise:

continuously feeding thermoplastic material (pellets, granules, flakes, powders, or combinations thereof) from a hopper into the barrel of an extruder;

gradually melting the thermoplastic material by, in examples, the mechanical energy generated by turning screws and/or by heaters arranged along the barrel;

forcing the molten thermoplastic material into a constant cross-sectional die that shapes the thermoplastic material into a decking surface that hardens when cooled; and optionally rolling a heated textured roller and applying pressure to a specified surface to add slip resistance texture or faux wood grain.

Acceptable variations to the above would be well understood by one of ordinary skill in the art.

BRIEF DESCRIPTION OF THE DRAWINGS

The accompanying drawings illustrate certain aspects of embodiments of the present invention and should not be used to limit the invention. Together with the written description the drawings serve to explain certain principles of the invention.

DETAILED DESCRIPTION OF THE INVENTION

Figure 1:
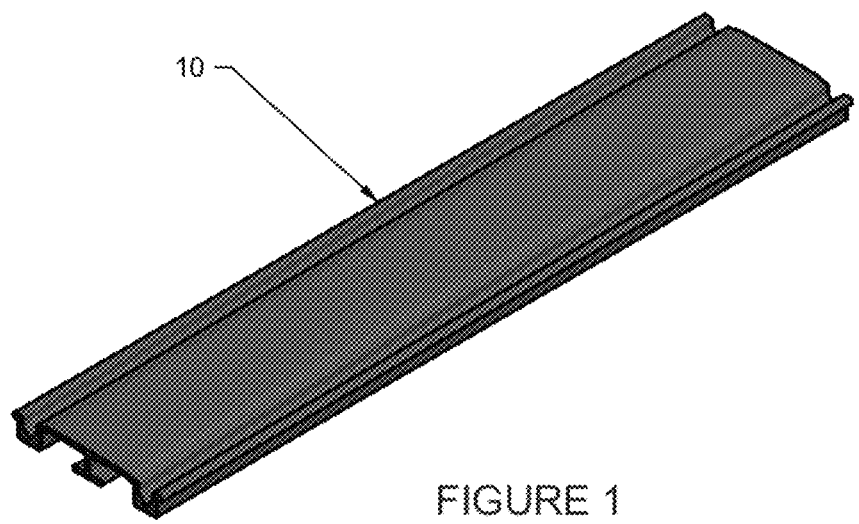
FIG. 1 is a diagram depicting an isometric view of a pultruded attachment or connection apparatus according to an embodiment of the invention.

Various embodiments will now be described in detail to provide an understanding of the structure, function, manufacture, and use of the devices and methods disclosed herein. It should be understood that the following discussion of exemplary embodiments is not intended as a limitation on the invention; rather, the following discussion is provided to give the reader a more detailed understanding of certain aspects and features of the invention.

One or more examples of the embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. It will be to those that various modifications and variations can be made in the practice of the present invention without departing from the scope or spirit of the invention; the features illustrated or described in connection with one exemplary embodiment may be combined with the features of other embodiments. Such modifications and variations are intended to be included within the scope of the present invention. All references cited in this application are hereby incorporated by reference in their entireties.

Regarding the manufacturing processes described herein, pultruded parts are generally not used in aesthetically pleasing applications unless they are painted. The reason for this is the lower cost resins, like thermoset polyesters, have poor ultraviolet (UV) resistance and fade in direct sunlight in a matter of months. UV inhibitors added to the liquid resin tend to deter short-term fading, but the pultrusion will eventually fade well before the life span of a wooden or low end plastic deck. High end plastic decks use a process called coextrusion where they use an inexpensive thermoplastic resin for the bulk of the deck board except on the outer surface that the sunlight would strike. On this outer surface, a thin layer of a very high-end (higher cost) UV-resistant thermoplastic, called a cap coat, is coextruded. This method helps the UV resistance and adds minimal cost, but does nothing to improve the already stiffness-deficient plastic deck board. The primary advantage to the pultruded attachment apparatus as discovered and explained for the current invention in this application is the added stiffness and strength over a wood or plastic deck board. Coextruding the decking surface capping apparatus with a very high-end, UV-resistant thermoplastic and coupling it with a stiff pultruded deck board attachment apparatus results in a finished deck board assembly that will be as UV-resistant as a high-end plastic deck board, but will also have the added benefit of being multiple times as stiff.

Pultruded parts using a thermosetting resin cannot be re-melted or post formed. Therefore, texturizing a pultrusion by re-melting is not an option. Material must be machined or ground away from the surface. This is undesirable as the fibrous reinforcement would be cut, leaving an exposed prickly fibrous surface. Thermoplastic extrusions are easily texturized as part of the process by running a near-formed extrusion under a texturized heated roller. The thermoplastic resin used for the extruded decking surface capping apparatus would be unreinforced because the pultruded deck board attachment apparatus provides some, most, or all of the stiffness and strength. Even under the harshest conditions, this unreinforced thermoplastic resin will not expose a prickly fibrous surface.

Extrusions are generally lower in cost than pultrusions. This is due to the lower raw material costs and the significantly faster processing speeds of extrusions. The extruded decking surface capping apparatus as described herein has an additional cost benefit in that the cross sectional area is significantly less than the pultruded attachment apparatus. Therefore, if the deck surface is damaged or needs renovated, only the extruded decking surface capping apparatus, the least costly component from a materials and installation standpoint, needs to be replaced. The structural pultruded attachment apparatus can remain installed as is.

The extruded decking surface capping apparatus, being in aspects an unreinforced thermoplastic resin, can flex a great deal and not break. This is desirable because when the extruded decking surface is snapped on to the pultruded connection apparatus, the hook shaped edge devices on the extruded decking surface must flex and not break around the edge nubs of the pultruded connection apparatus. Therefore, the manufacturing methods described herein for the particular aspects, embodiments, components, and parts taught herein provide for a novel, non-obvious, and an unexpectedly superior advantage over prior art attempts at non-wood decking apparatuses.

Turning to the Figures, FIG. 1 illustrates an embodiment showing an isometric view of a pultruded attachment apparatus 10. In a preferred embodiment, it is produced using a pultrusion process wherein a thermoset resin matrix is combined with a fibrous reinforcement and cured into a structural member. The fibrous reinforcement may include, but is not limited to: fiberglass, carbon fiber, flax, hemp, aramid, basalt, or combinations thereof. The fibrous reinforcement can be oriented in multiple directions by using, for example, unidirectional rovings, unidirectional stitched rovings, continuous filament mat (e.g., fiber material), chopped fiber material, woven material, point bonded material, or combinations thereof. The stiffness and strength in any direction of the of the pultruded attachment apparatus 10 can be modified as required and one of ordinary skill in the art would understand how to adjust a pultrusion process to adjust stiffness and strength. The resin matrix used to adhere the fibrous reinforcement can be, in aspects, a thermoset or thermoplastic polyester, vinylester, epoxy, phenolic, polyurethane, modified acrylic, or combinations thereof. The resin matrix can be pigmented to most any color. The pultruded deck board attachment or connection apparatus 10 will resist rotting, distortion, or loss of any appreciable strength or stiffness due to water or ultraviolet exposure, according to the method of manufacture claimed herein.

Figure 2:
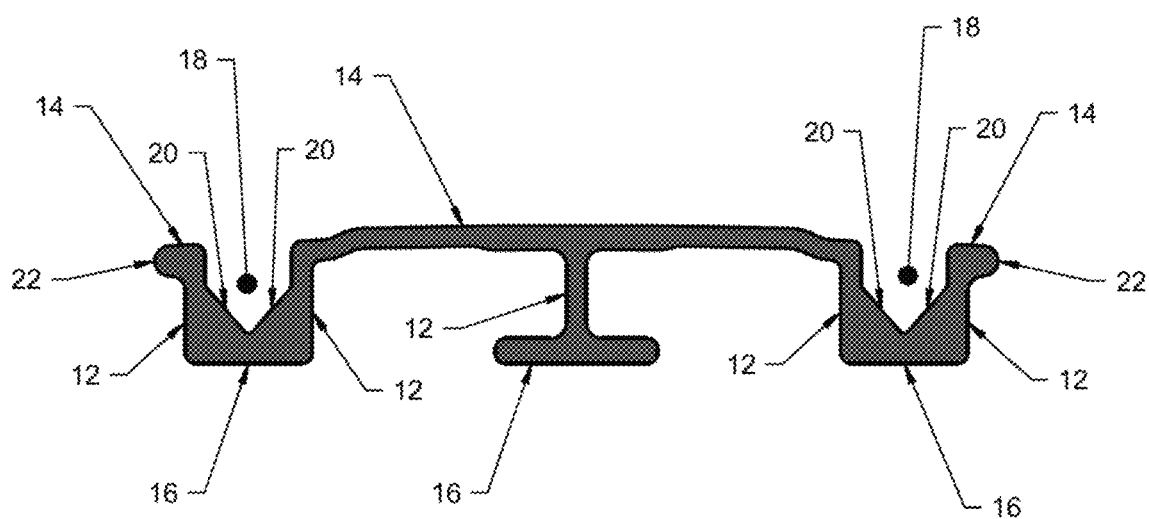
FIG. 2 is a diagram depicting an end view of a pultruded attachment or connection apparatus 10 according to an embodiment of the invention.

FIG. 2 illustrates a possible embodiment showing an end view of a pultruded deck board attachment 10. Being pultruded, in a preferred embodiment, it is a constant or near-constant (in cases uniform and/or consistent) cross sectional structural member which can be cut to any specified length. The cross section is, in a preferred embodiment, made of vertical ribs or extensions 12 that resist longitudinal deflection due to shear and near horizontal members on the top 14 and near horizontal members or feet on the bottom 16 to resist deflection due to bending or other forces. One or more fastener recesses 18 can accommodate fasteners for attachment. A wider version with multiple fastener recesses 18, including the ability to includes one, two, three, four, or more fasteners, could be implemented. In a preferred embodiment, a finished deck board width may be sized to match a standard width 5½" deck board. A thicker or thinner wall thickness could be implemented to make the pultruded deck board attachment 10 a heavy duty or light duty apparatus, depending on the design requirements. In this preferred embodiment, two fastener recesses are shown with shaped bottom surfaces 20 to accommodate a fastener head, such as the head of a screw or nail. In a preferred embodiment, the shaped bottom surface 20 self-centers the drill or fastener tip in the fastener recesses 18. In this preferred embodiment, the shaped bottom surface 20 accommodates a flathead fastener with a conical head, but the bottom surface could be shaped to accommodate other fasteners or fastener heads, such as other angled recesses, rounded recesses, or flat-bottomed recesses. Edge nubs 22 on either side of the pultruded attachment/connection apparatus 10 allows for the attachment of an extruded decking surface capping apparatus 24, although in embodiments there are no nubs or nubs of different sizes and shapes.

Figure 3:
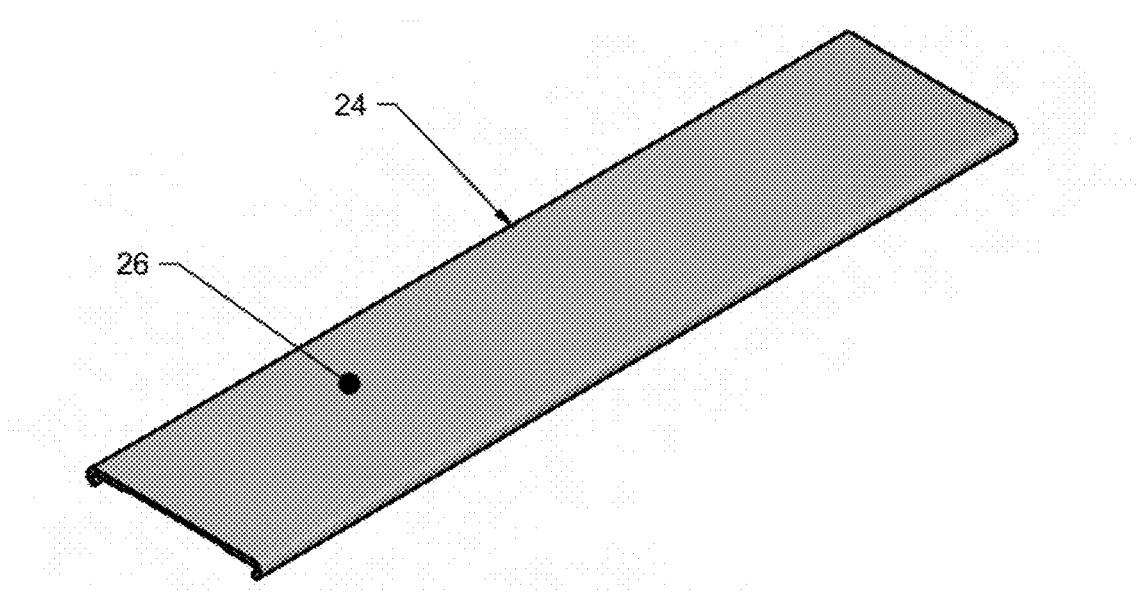
FIG. 3 is a diagram depicting an isometric view of an extruded decking surface capping apparatus according to an embodiment of the invention.
Figure 4:
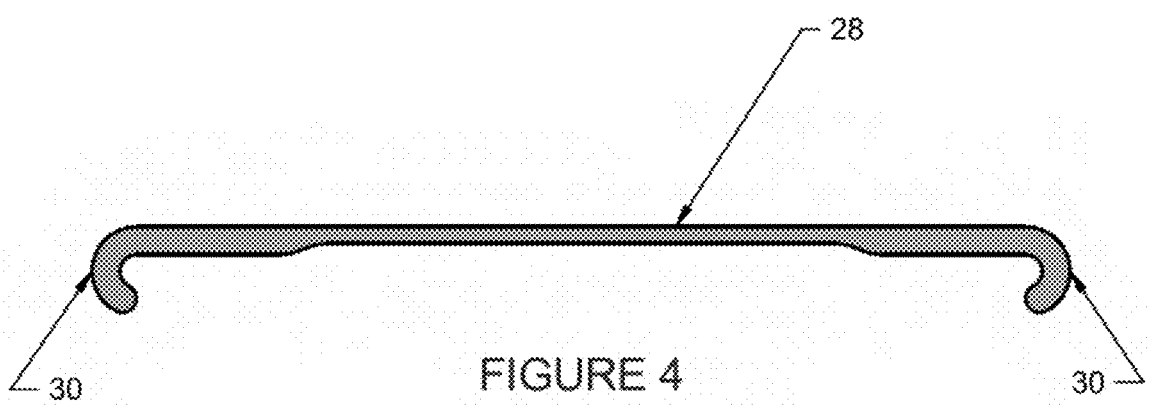
FIG. 4 is a diagram depicting an end view of an extruded decking surface capping apparatus according to an embodiment of the invention.

FIG. 3 illustrates an embodiment showing an isometric view of a decking surface capping apparatus 24, which in preferred embodiments is manufactured by an extrusion process. It is preferably produced using an extrusion process wherein a thermoplastic resin matrix is melted and formed into, in aspects, a constant, uniform cross sectional shape. The top surface 26 of the extruded decking surface capping apparatus 24 can be smooth or textured and be pigmented to most any color. FIG. 4 shows an end view of the preferred extruded decking surface capping apparatus 24. The top surface profile 28 of the extruded decking surface capping apparatus 24 can be shaped straight or curved across the width. Hook shaped edge devices 30 are employed, in aspects, for attachment to, for example, the preferred pultruded deck board attachment apparatus 10, although other mechanisms to attach the decking surface to the deck board attachment/connection apparatus are contemplated, including fastening the two apparatuses.

Figure 5:
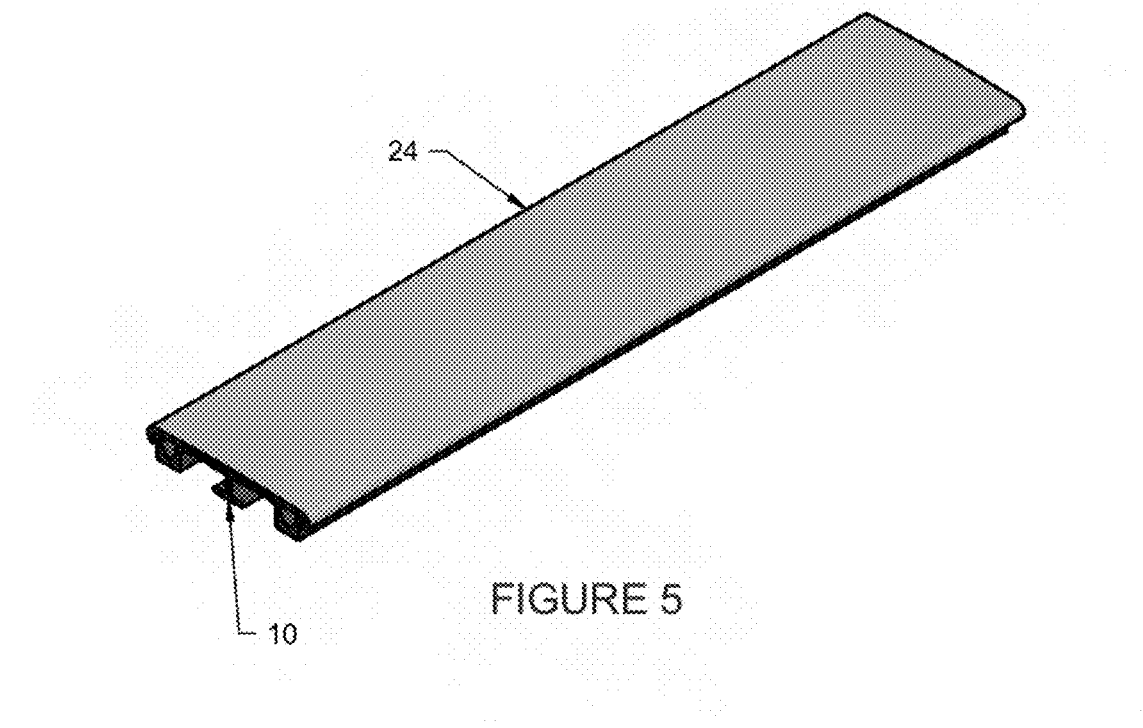
FIG. 5 is a diagram depicting an isometric view of an extruded decking surface capping apparatus snapped onto a pultruded attachment or connection apparatus according to an embodiment of the invention.
Figure 6:
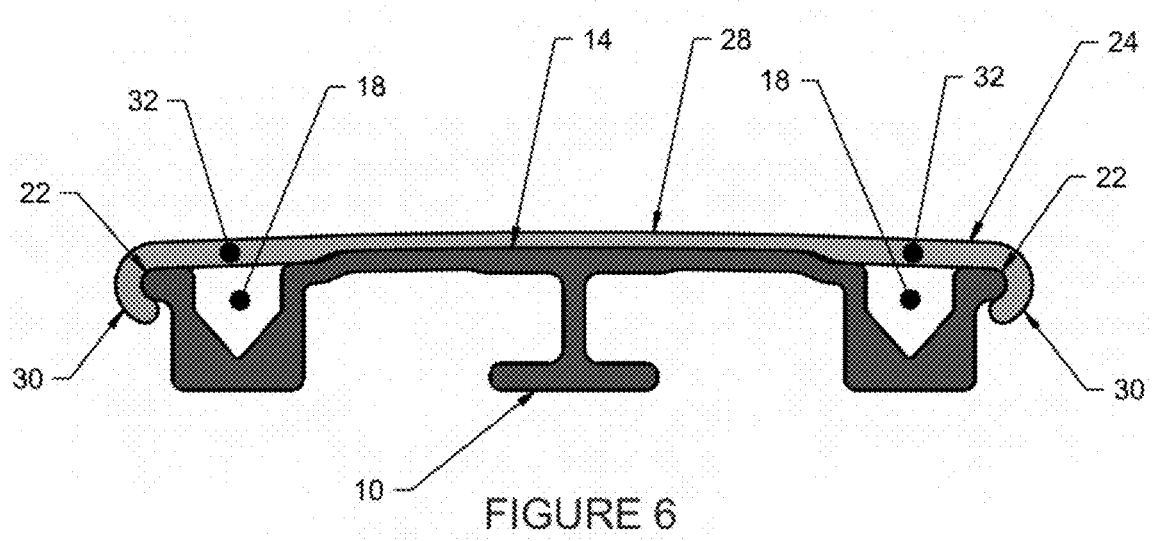
FIG. 6 is a diagram depicting an end view of an extruded decking surface capping apparatus snapped onto a pultruded attachment or connection apparatus according to an embodiment of the invention.

FIG. 5 illustrates an isometric view of the preferred extruded decking surface capping apparatus 24 attached to the preferred pultruded attachment apparatus 10. FIG. 6 shows an end view of the preferred extruded decking surface capping apparatus 24 attached to a pultruded deck board attachment 10. The hook shaped edge device 30 is, in aspects, snapped around and on to edge nubs 22 on either side of the pultruded deck board attachment apparatus 10. In embodiments, the extruded decking surface capping apparatus 24 conforms to the shape of the top surface 14 of the pultruded deck board attachment 10. In the particular embodiment illustrated in FIG. 6, the top surface profile 28 of the extruded decking surface capping apparatus 24 is slightly curved to add post-tensioning to the extruded decking surface capping apparatus 24 minimizing gapping. The slight curve also allows for shedding of rain water. The extruded decking surface capping apparatus 24 can be extruded with a constant, uniform thickness or locally thicker to accommodate, for example, covering the fastener recesses 18. In embodiments, the thickness of portion 32 of the extruded decking surface capping apparatus is increased to stiffen the extruded decking surface capping apparatus 24 where it spans across the fastener recesses 18. This would prevent excess deflection from applied force and such items as heavy furniture, a chair foot, a high heel, a wheelchair wheel, etc.

Figure 7:
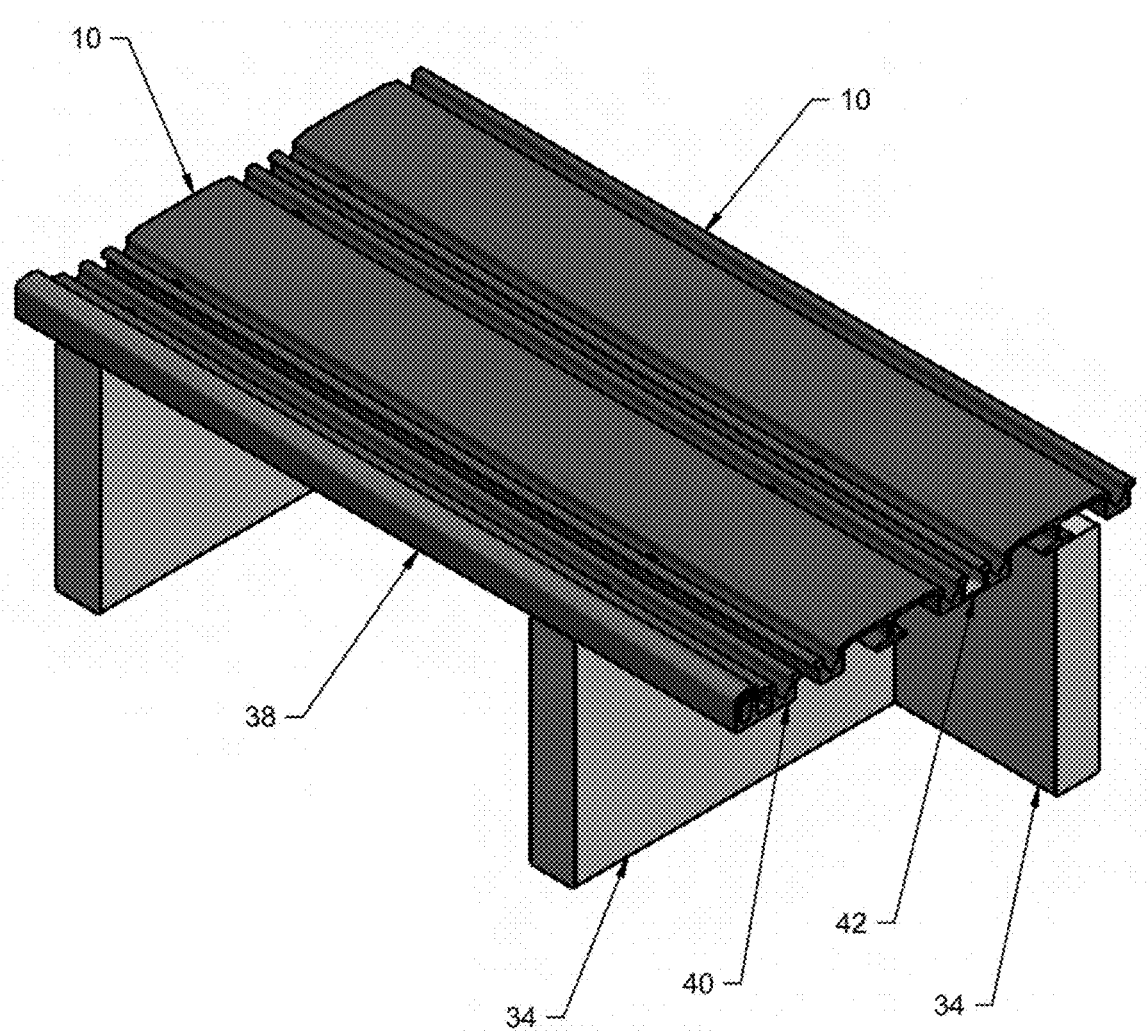
FIG. 7 is a diagram depicting an isometric view of an extruded finishing edge cap, two pultruded attachment or connection apparatus, a partial pultruded attachment or connection apparatus, and an optional extruded drain channel all attached to a joist substructure according to an embodiment of the invention.
Figure 8:
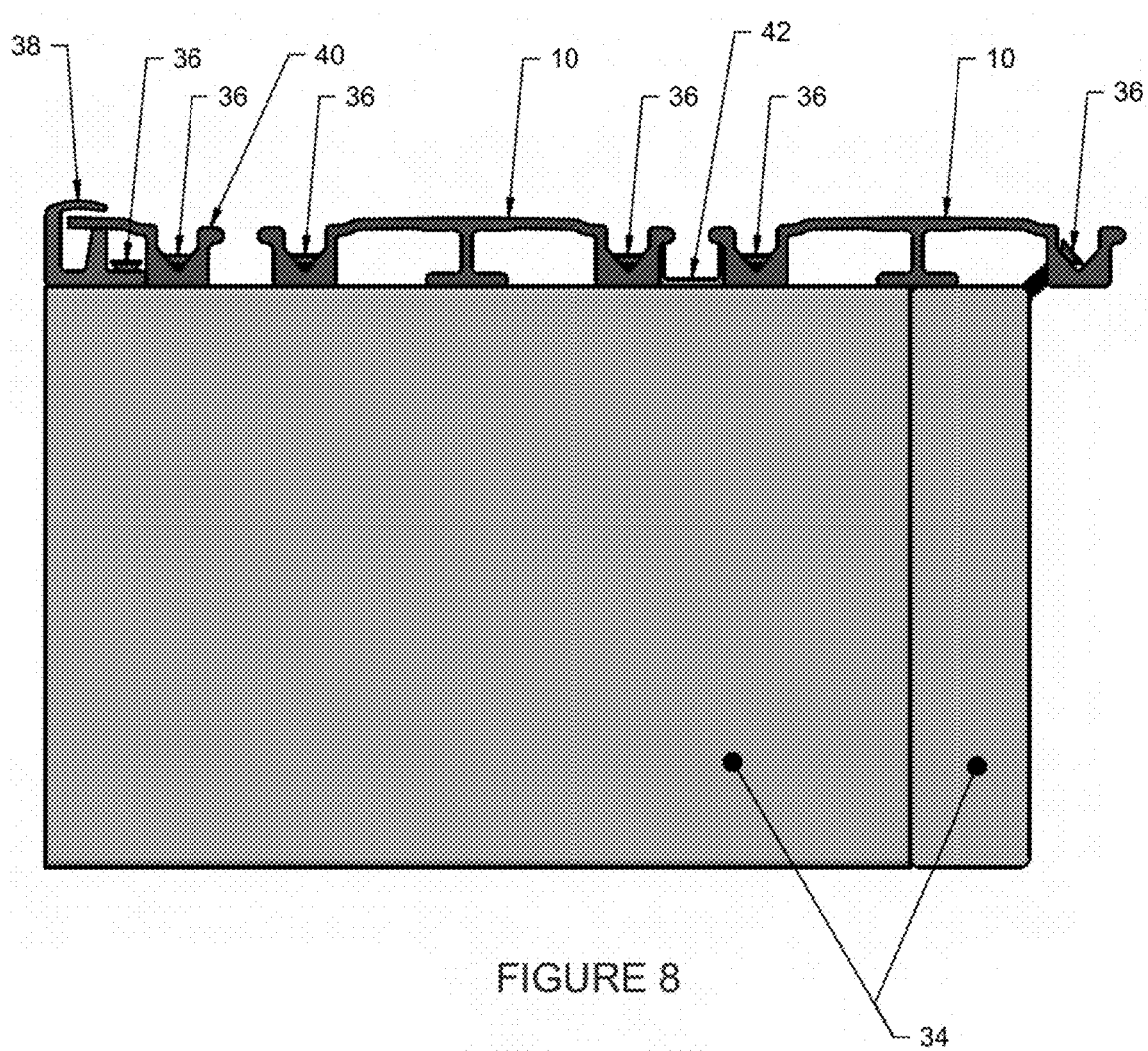
FIG. 8 is a diagram depicting an end view of an extruded finishing edge cap, two pultruded attachment or connection apparatus, a partial pultruded attachment or connection apparatus, and an optional extruded drain channel all attached to a joist substructure according to an embodiment of the invention.

FIG. 7 illustrates an isometric view of a deck subassembly and FIG. 8 shows an end view of a deck subassembly. In the pictured embodiments, two pultruded attachments 10 are fastened to a substructure 34 using fasteners 36, such as a flathead deck screw. Butt joints of the pultruded attachments 10, preferably located directly on the substructure 34, are allowable since said butt joint may later, in aspects, be covered by an extruded decking surface capping apparatus 24. An edge cap trim 38, which is preferably made by an extrusion process, may be fastened to a substructure 34 using a fastener 36, such as a flathead deck screw. A partial-width pultruded attachment apparatus 40, cut from a pultruded attachment apparatus 10, for example, is fastened to a substructure 34 using a fastener 36, such as a flathead deck screw. An optional extruded drain channel 42 can be placed in between the pultruded deck board attachments 10 to divert any water that sheds off of the later applied extruded decking surface capping apparatus 24. The optional extruded drain channel 42 can also be used as a spacer when installing the pultruded deck board attachments 10.

Figure 9:
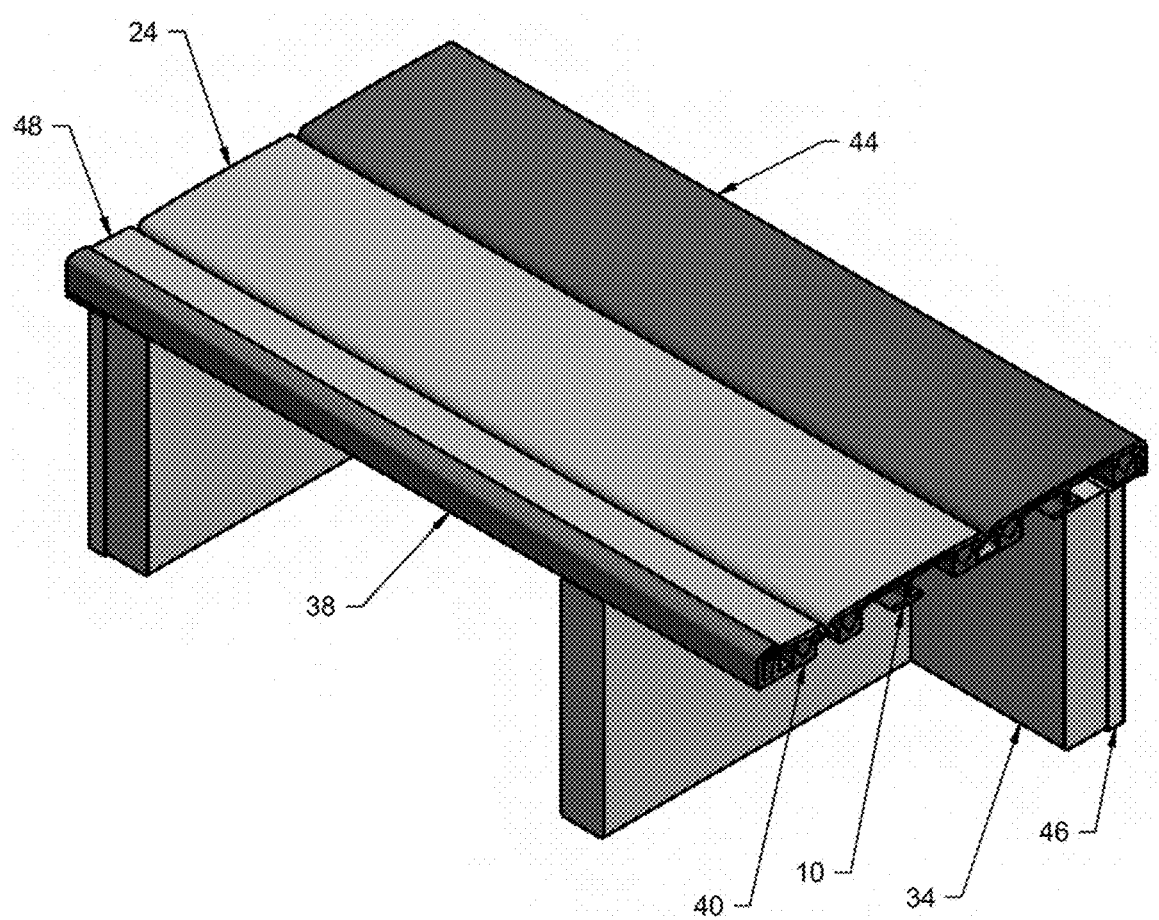
FIG. 9 is a diagram depicting an isometric view of all snap-on accessories covering the pultruded attachment or connection apparatus according to an embodiment of the invention.
Figure 10:
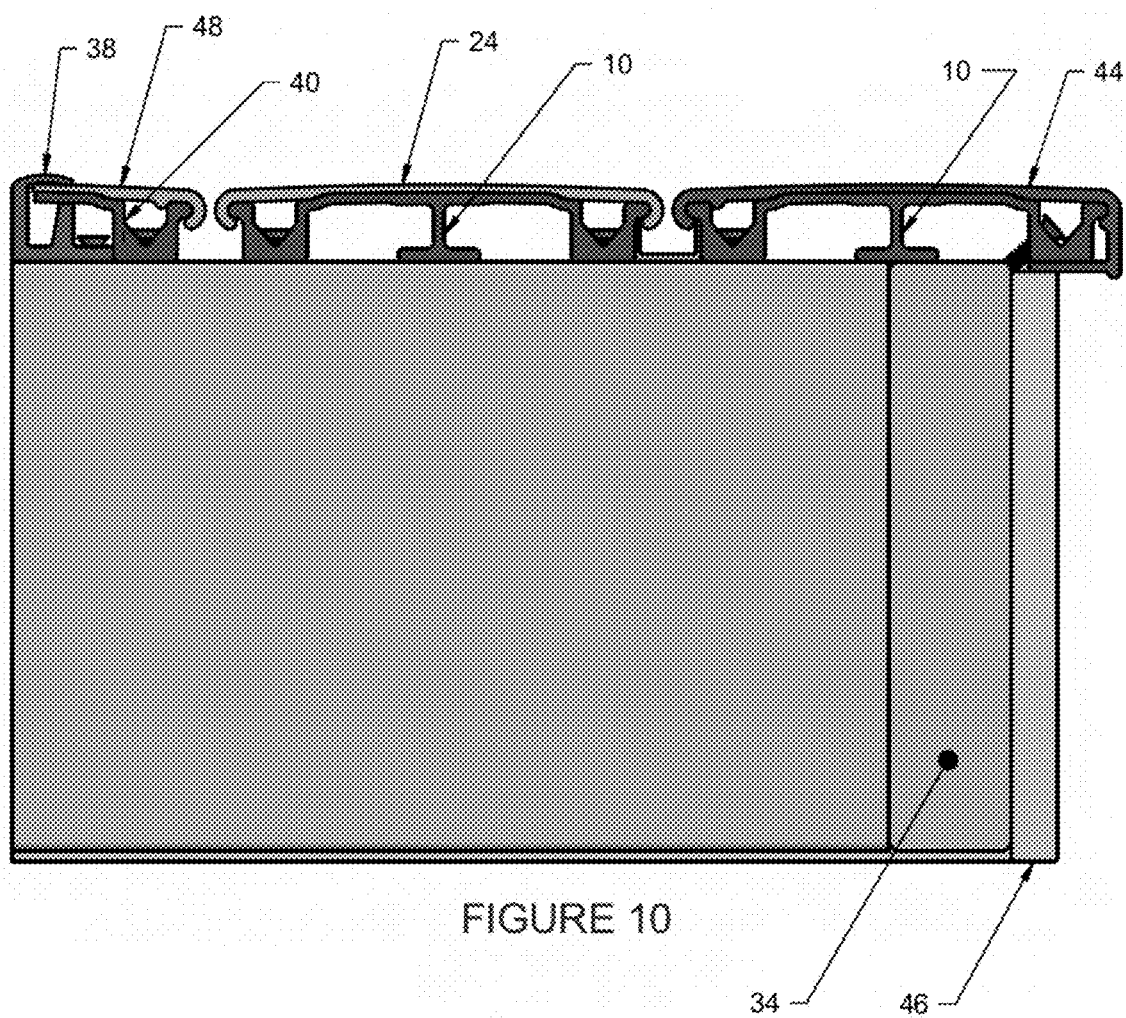
FIG. 10 is a diagram depicting an end view of all snap-on accessories covering the pultruded attachment or connection apparatus according to an embodiment of the invention.

FIG. 9 illustrates an embodiment showing an isometric view of a deck final assembly, and FIG. 10 shows an end view of this deck final assembly. In this embodiment, an extruded decking surface capping apparatus 24 is snapped on to a pultruded attachment apparatus 10. The extruded decking surface capping apparatus 24 will mostly, completely, or partially cover the pultruded deck board attachment 10 butt joints. This allows for the use of shorter lengths of pultruded deck board attachments 10, thereby reducing scrap. Anomalies with the pultruded deck board attachments 10, such as color variations, construction scuffs, production scaling, and errantly drilled fastener holes are not reason for scrap due to the extruded decking surface capping apparatus 24 full coverage according the current invention. An optional extruded edge trim decking surface capping apparatus 44 may be snapped onto or otherwise fastened to a pultruded deck board attachment 10. A fascia board 46 can be fastened to the substructure 34, in aspects. A partial width extruded decking surface capping apparatus 48, in aspects cut from an extruded edge trim decking surface capping apparatus 44 or manufactured independently using extrusion, pultrusion, or another method, may be fitted into the extruded edge cap trim 38 and snapped on to a partial width pultruded deck board attachment 40. In a preferred embodiment, the extruded decking surface capping apparatus 24, optional extruded edge trim decking surface capping apparatus 44, partial-width extruded decking surface capping apparatus 48, can all be replaced without the removal of the structural pultruded deck board attachments 10. Removal by unsnapping or cutting these components that cover the pultruded deck board attachments 10 is beneficial if they become stained, marred, scratched, deformed by excessive heat, sun faded, or aesthetically outdated, for example.

Figure 11:
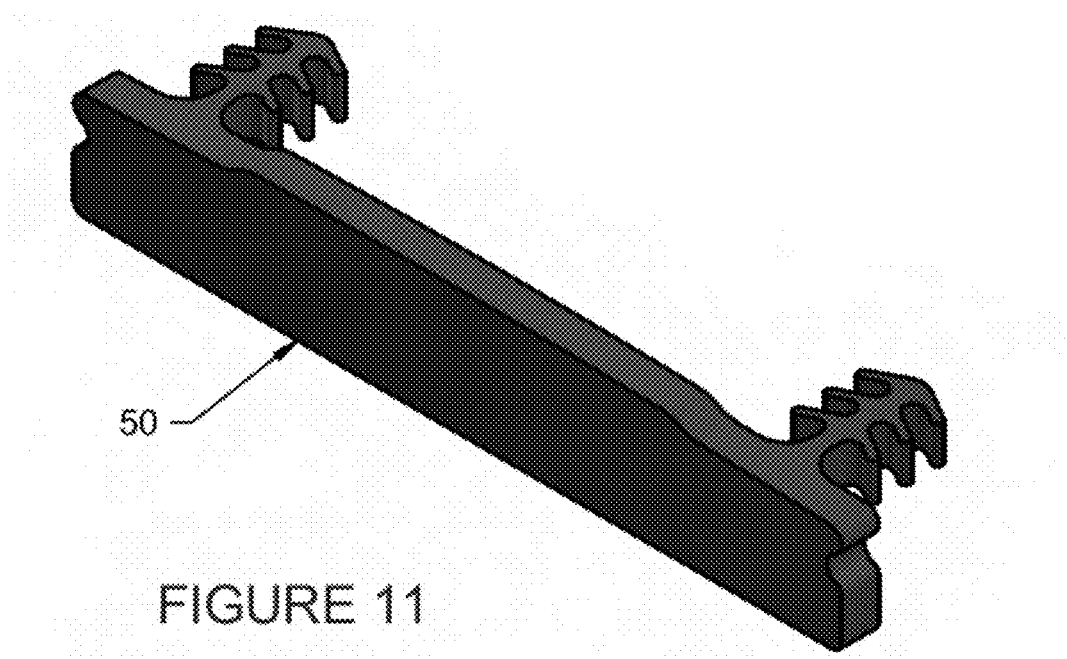
FIG. 11 is a diagram depicting an isometric view of a deck board end cap according to an embodiment of the invention.
Figure 12:
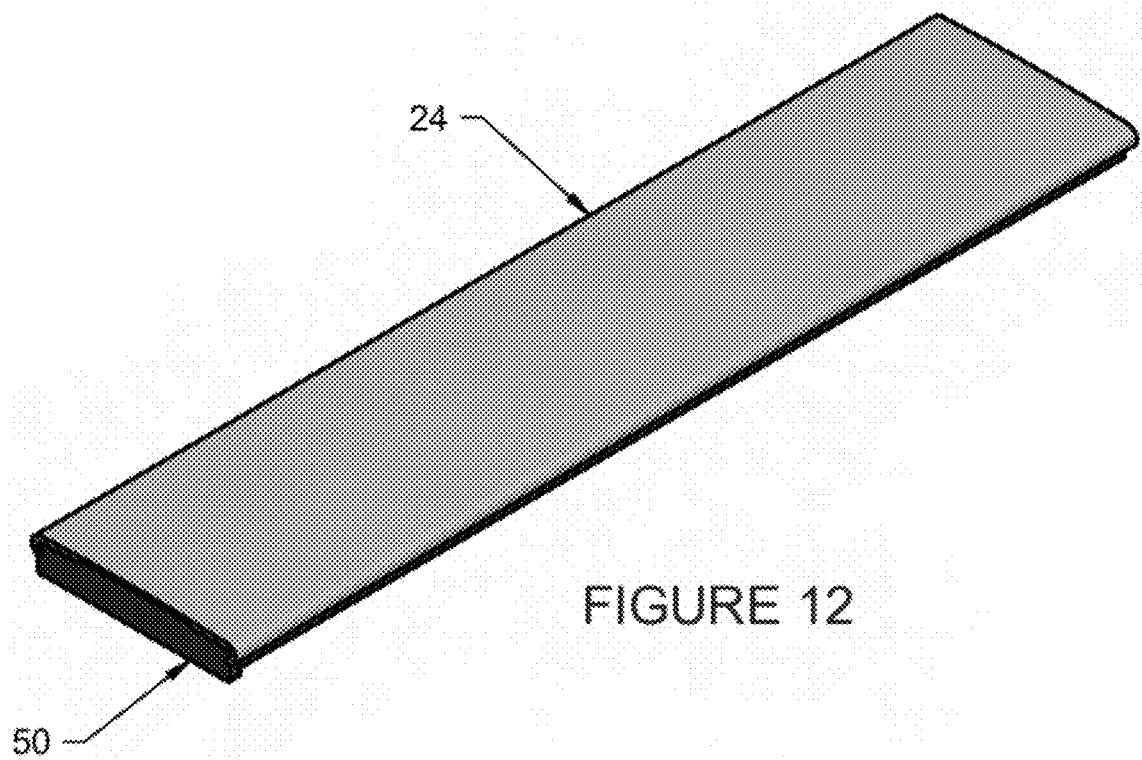
FIG. 12 is a diagram depicting an isometric view of a deck board end cap attached to a pultruded attachment or connection apparatus according to an embodiment of the invention.
Figure 13:
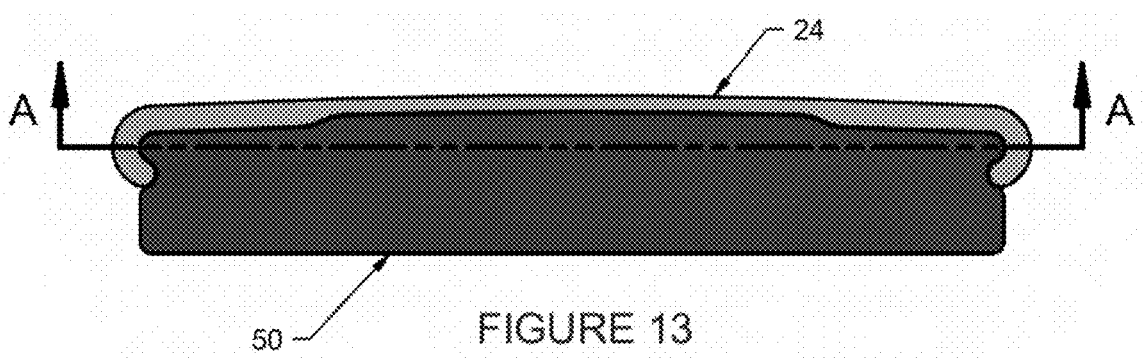
FIG. 13 is a diagram depicting an end view of a deck board end cap attached to a pultruded attachment or connection apparatus according to an embodiment of the invention.
Figure 14:
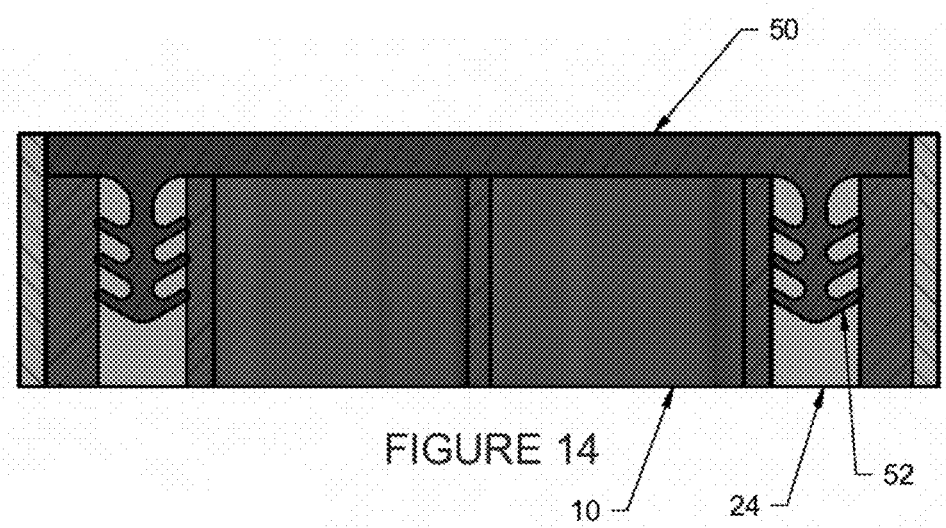
FIG. 14 is a diagram depicting a section view of a deck board end cap attached to a pultruded attachment or connection apparatus according to an embodiment of the invention.

FIG. 11 illustrates an embodiment of a deck board end cap 50. The deck board end cap 50 may be a nonstructural item to cover the end of a pultruded attachment apparatus 10 to make it appear as a solid board. A preferred manufacturing method would be injection molding, although other processes such as, by way of example only, compression molding or reaction injection molding could be used. FIG. 12 illustrates an isometric view of an assembled deck board end cap 50 along with a deck board. FIG. 13 shows an end view of an assembled deck board end cap 50 and an extruded decking surface capping apparatus 24. FIG. 14 illustrates a section view showing the deck board end cap 50 engaged with the fastener recesses 18 of the pultruded attachment apparatus 10. In this embodiment, the engagement method is a press fit of the deck board end cap fingers 52 to the fastener recesses 18 of the pultruded deck board attachment 10. The deck board end cap 50 can also be adhesively bonded or mechanically fastened.

Figure 15:
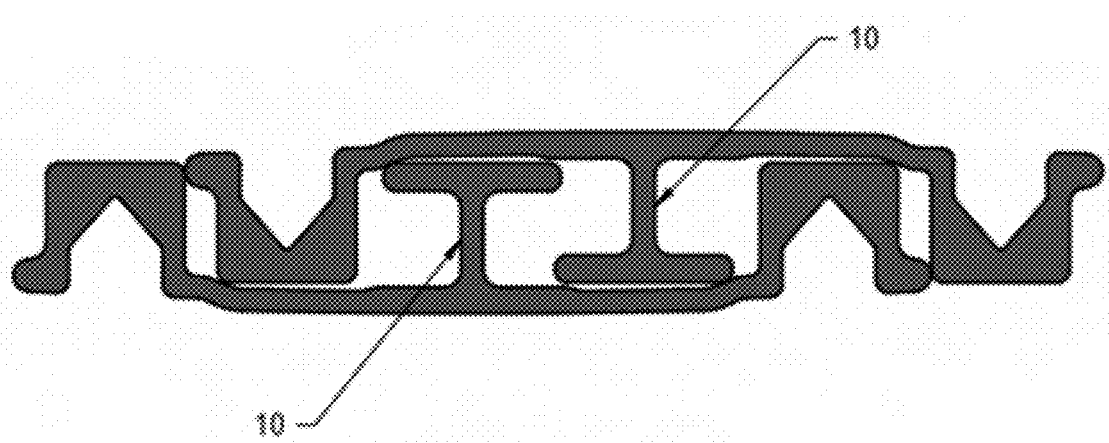
FIG. 15 is a diagram depicting two pultruded attachment or connection apparatus fit against one another in a shipping or packaging configuration, for example, according to an embodiment of the invention

FIG. 15 illustrates the nesting capability of the pultruded deck board attachments 10. This can minimize packaging volumes when shipped, potentially reducing freight costs. A solid deck board, for example, does not have this nesting capability.

Figure 16:
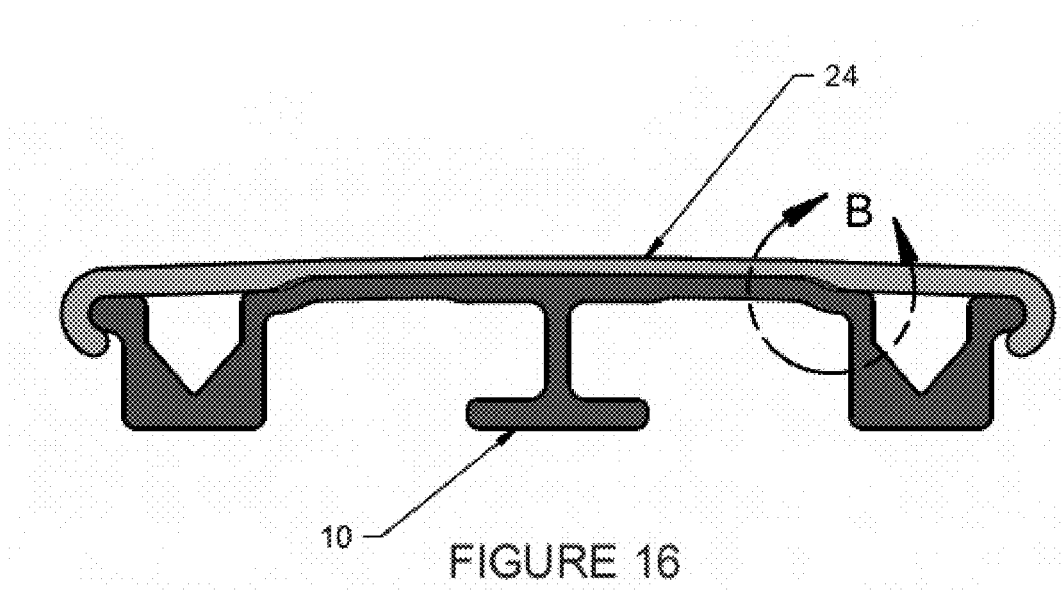
FIG. 16 is a diagram depicting an end view of an extruded decking surface capping apparatus snapped and adhesively bonded to a pultruded attachment or connection apparatus according to an embodiment of the invention.
Figure 17:
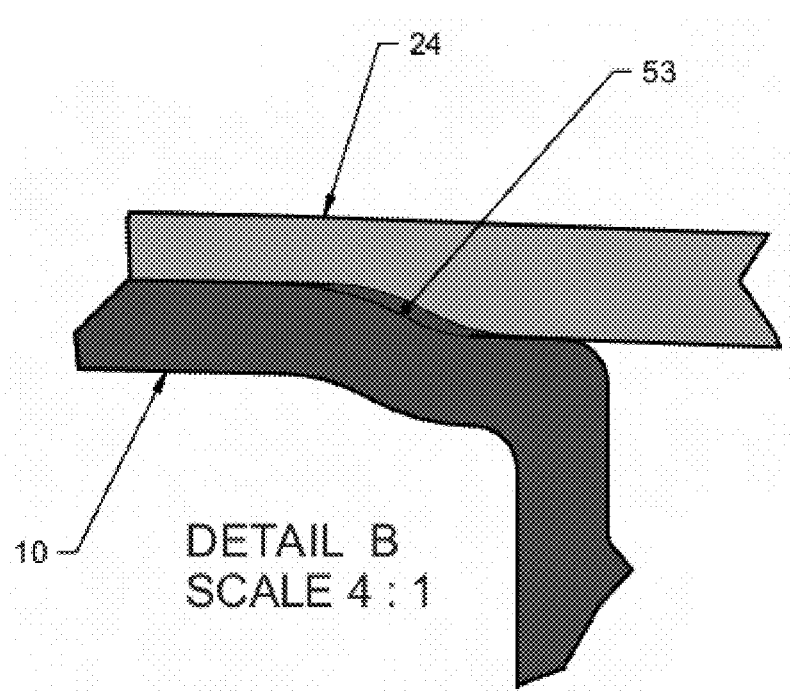
FIG. 17 is a diagram depicting a detailed view showing an adhesively filled gap between an extruded decking surface capping apparatus and a pultruded attachment or connection apparatus according to an embodiment of the invention.
Figure 18:
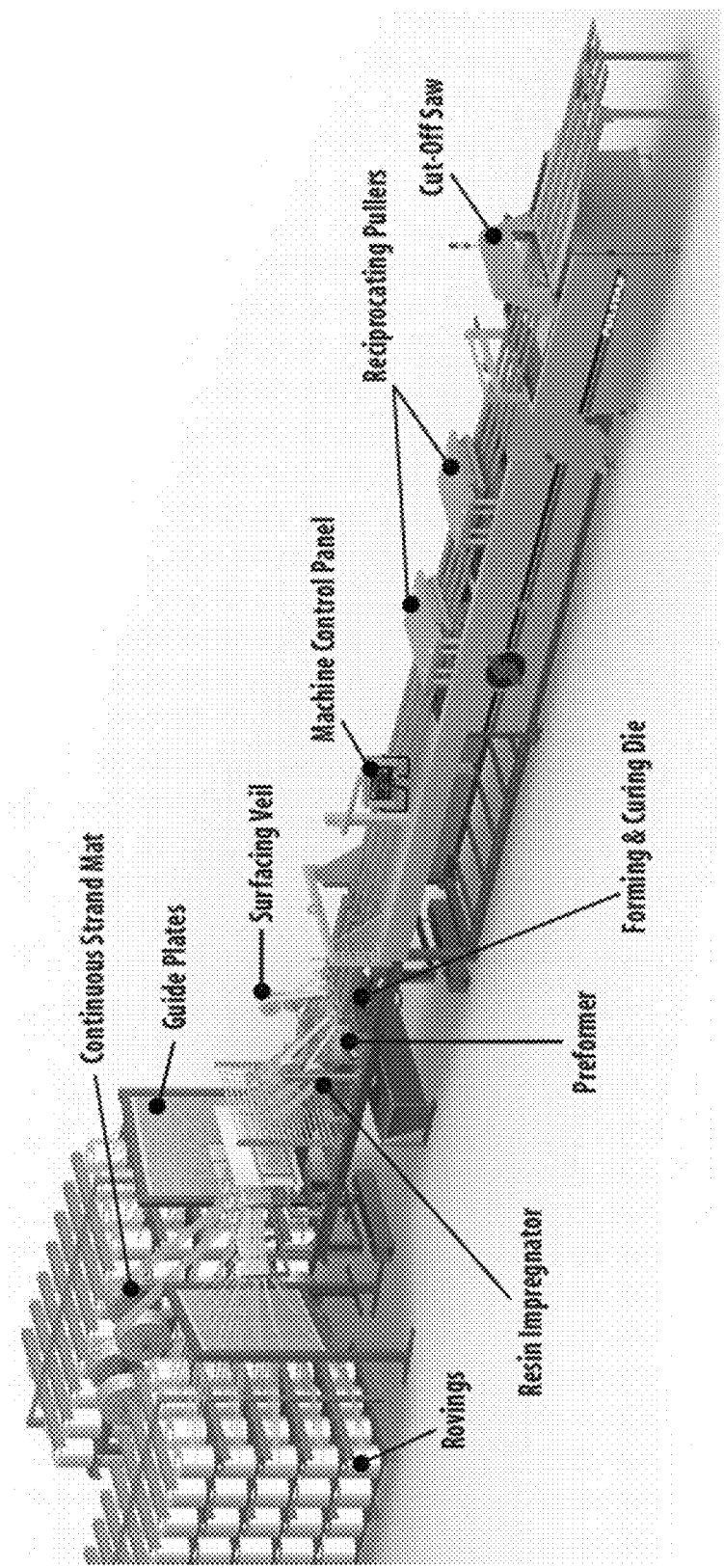
FIG. 18 is a depiction of a pultrusion process according to an embodiment of the present invention.
Figure 19:
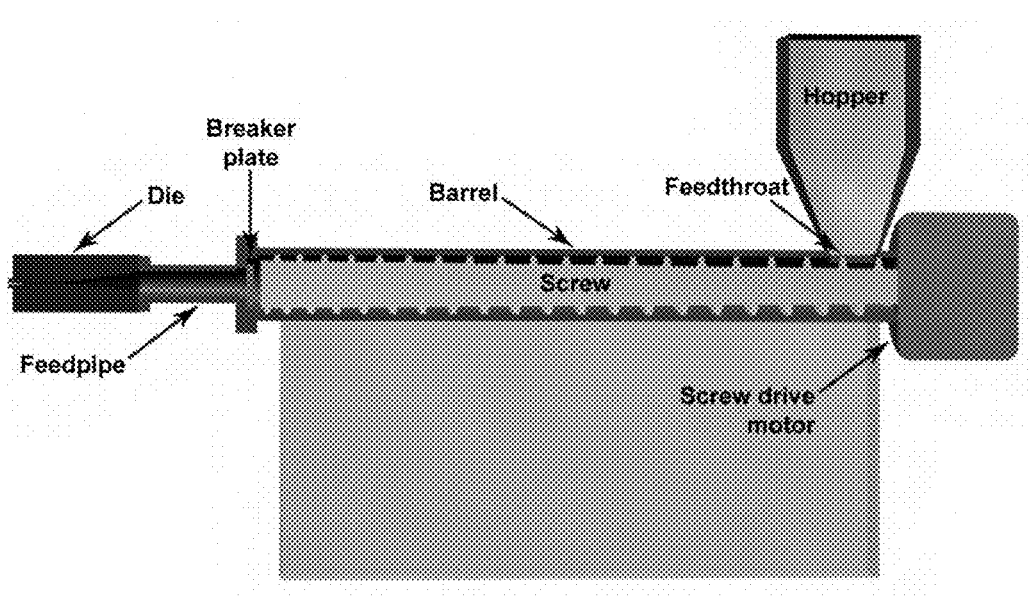
FIG. 19 is a depiction of an extrusion process according to an embodiment of the present invention.

FIG. 16 illustrates an end view of an extruded decking surface capping apparatus 24 snapped and optionally adhesively bonded to a pultruded deck board attachment 10. FIG. 17 is a diagram depicting a detailed view of designed adhesive gap 53 between an extruded decking surface capping apparatus 24 and a pultruded deck board attachment 10. A designed adhesive gap 53 allows for a defined adhesive bond line thickness. Without the designed adhesive gap 53, the adhesive joint can be starved of adhesive resulting in a structurally deficient adhesive bond. Optionally, a designed adhesive gap can be accomplished by pultruding a groove on the top-side of the pultruded deck board attachment 10 or extruding a groove on the underside of the extruded decking surface capping apparatus 24.

One skilled in the art will recognize that the disclosed features may be used singularly, in any combination, or omitted based on the requirements and specifications of a given application or design. When an embodiment refers to "comprising" certain features, it is to be understood that the embodiments can alternatively "consist of" or "consist essentially of" any one or more of the features. Other embodiments of the invention will be apparent to those skilled in the art from consideration of the specification and practice of the invention.

It is noted in particular that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in this disclosure are each individually incorporated by reference herein in their entireties and as such are intended to provide an efficient way of supplementing the enabling disclosure of this invention as well as provide background detailing the level of ordinary skill in the art.

The invention claimed is:
1. A decking apparatus comprising:
a pultruded attachment apparatus that attaches to a decking joist, comprising a thermosetting resin matrix comprising one or more of polyester, vinylester, epoxy, phenolic, polyurethane, or a combination thereof, and fibrous reinforcements comprising one or more of fiberglass, carbon fiber, aramid, basalt, or a combination thereof, wherein the fibrous reinforcements are processed in a form of continuous unidirectional rovings, continuous unidirectional stitched rovings, continuous filament mat, continuous woven material, or a combination thereof; and an extruded decking surface capping apparatus comprising thermoplastic material, wherein the extruded decking surface capping apparatus is snapped on to opposite longitudinal sides of the pultruded attachment apparatus and fixedly attached to one or more points spaced inwardly from the snap connections between the pultruded attachment apparatus and the extruded decking surface capping apparatus, and wherein the extruded decking surface capping apparatus substantially covers a top surface of the pultruded attachment apparatus;

wherein a top surface of the extruded decking surface capping apparatus comprises a texture or grooves; and wherein the pultruded attachment apparatus comprising the thermosetting resin matrix and the fibrous reinforcements is at least twice as stiff as a thermoplastic product which does not include the fibrous reinforcements.

2. The decking apparatus of claim 1, wherein the pultruded attachment apparatus further comprises a plurality of vertical extensions and horizontal flanges.

3. The decking apparatus of claim 1, wherein the pultruded attachment apparatus further comprises two or more support extensions, wherein the two or more support extensions are capable of being attached to the decking joist.

4. The decking apparatus of claim 1, wherein the pultruded attachment apparatus further comprises nubs on one or more sides of the pultruded attachment apparatus capable of allowing the extruded decking surface capping apparatus to be affixed to the pultruded attachment apparatus.

5. The decking apparatus of claim 4, wherein the nubs are rounded.

6. The decking apparatus of claim 1, wherein the pultruded attachment apparatus further comprises nubs on one or more sides or edges of the pultruded attachment apparatus capable of allowing the extruded decking surface capping apparatus to be snapped on to the pultruded attachment apparatus.

7. The decking apparatus of claim 6, wherein the nubs are rounded.

8. The decking apparatus of claim 1, wherein the fibrous reinforcements comprise continuous unidirectional fiberglass.

9. The decking apparatus of claim 1, wherein the pultruded attachment apparatus or the extruded decking surface capping apparatus further comprise a crowned top.

10. The decking apparatus of claim 1, wherein the extruded decking surface capping apparatus snapped on to the pultruded attachment apparatus and fixedly attached to one or more points spaced inwardly from the snap connections between the pultruded attachment apparatus and the extruded decking surface capping apparatus comprises bent or hooked sides or edges at each side or edge of the extruded decking surface capping apparatus, which are capable of coupling the extruded decking surface capping apparatus to the pultruded attachment apparatus.

11. The decking apparatus of claim 1, wherein the extruded decking surface capping apparatus completely covers the top surface of the pultruded attachment apparatus.

* * * * *